July 17, 1956

H. E. BALSIGER 2,754,633

CAM GRINDER

Filed Jan. 4, 1954

INVENTOR.
HAROLD E. BALSIGER
BY

ATTORNEY

United States Patent Office — 2,754,633 — Patented July 17, 1956

2,754,633
CAM GRINDER

Harold E. Balsiger, Waynesboro, Pa., assignor to Landis Tool Company, Waynesboro, Pa.

Application January 4, 1954, Serial No. 401,781

10 Claims. (Cl. 51—105)

This invention relates to machines for grinding the cams of automotive cam shafts, particularly where some of the cams are tapered in one direction and others in the opposite direction.

At present, such shafts are ground on machines in which the wheel support is swivelled between two positions. In one position the angular relation between the grinding wheel and work is such as to grind a taper on a cam in one direction. In the other position the angular relation between wheel and work is such as to grind a taper on a cam in the opposite direction. Additional means may be provided for stopping the wheel support in an intermediate position for grinding a portion of the work piece in which the axes of the wheel and work are parallel and the portion to be ground is also parallel with the axes instead of tapered.

It is an object of the present invention to provide means whereby a single apparatus will serve to locate the swivelling member in any selected angular position within its range of movement.

Present machines require special apparatus operable in conjunction with the intermittent longitudinal indexing movement between the wheel support and work support in order to locate the swivelling member in opposite directions.

It is an object of the present invention to provide means whereby the swivelling member will always move in the same direction to the selected position.

For accomplishing the above objectives, a series of movable stops is provided which may be positioned by the longitudinal moving member to locate the swivelling member in any desired angular position. The movement of the swivelling member is co-ordinated with the longitudinal index movement so that each time an indexing operation occurs, the swivelling member is moved in one direction beyond any of the predetermined grinding positions and at the end of the indexing movement, the swivelling member moves in the opposite direction until it engages the stop which was moved into the path of the swivelling member during the indexing movement.

In the practice of this invention, it is to be understood that either the work support or the wheel base may be swivelled. For the purpose of illustration, both members are shown as being mounted for swivelling.

Details of an apparatus in which the wheel support is swivelled are shown in Patent 2,654,189, granted October 6, 1953. Details of an apparatus in which the work carriage is swivelled are shown in co-pending application Ser. No. 254,499, filed November 2, 1951.

This specification will describe only such details as do not appear in the above patent and application. However, details of both are repeated in the drawings forming a part of this application.

Figure 1:
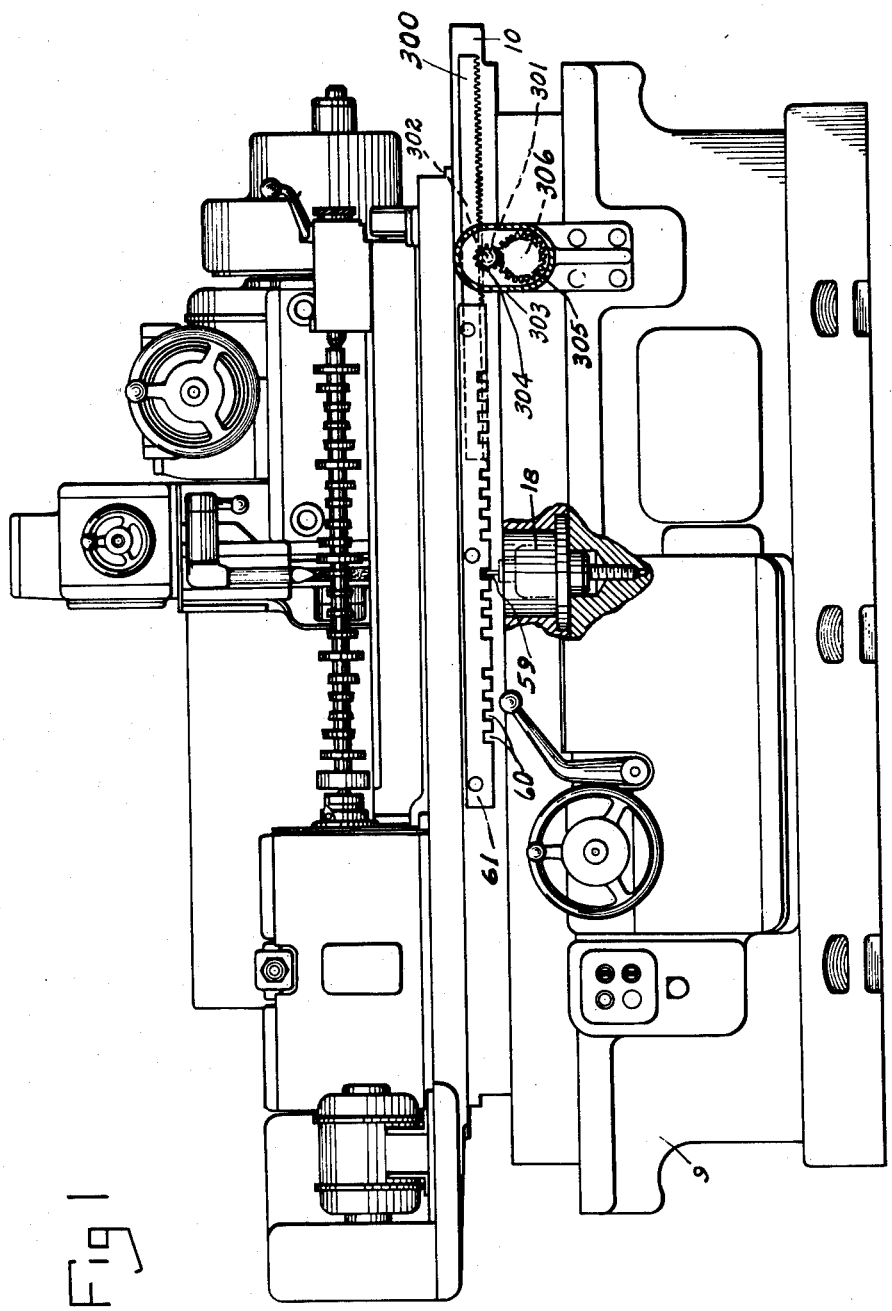
Figure 1 is a front elevation.
Figure 2:
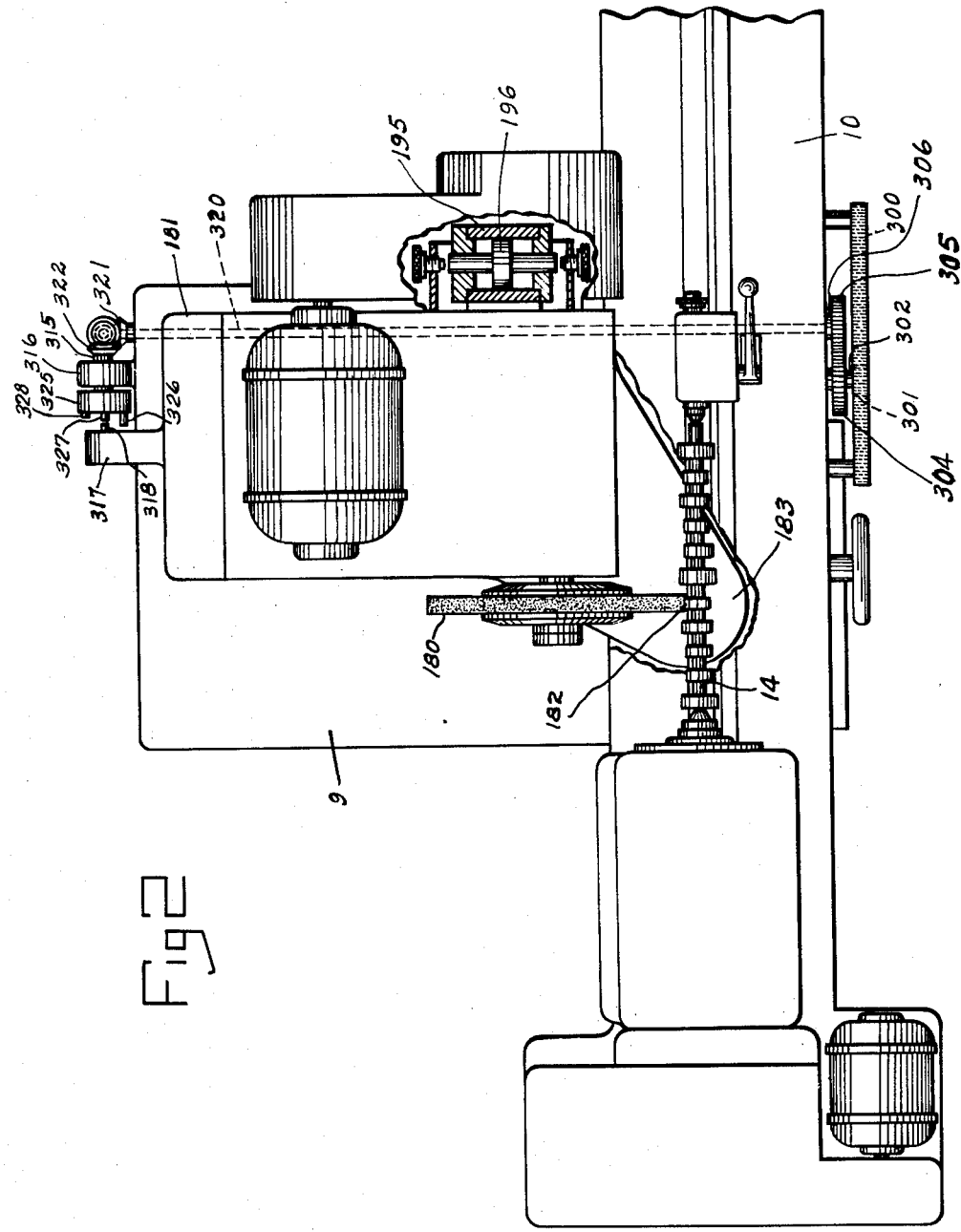
Figure 2 is a plan view.
Figure 3:
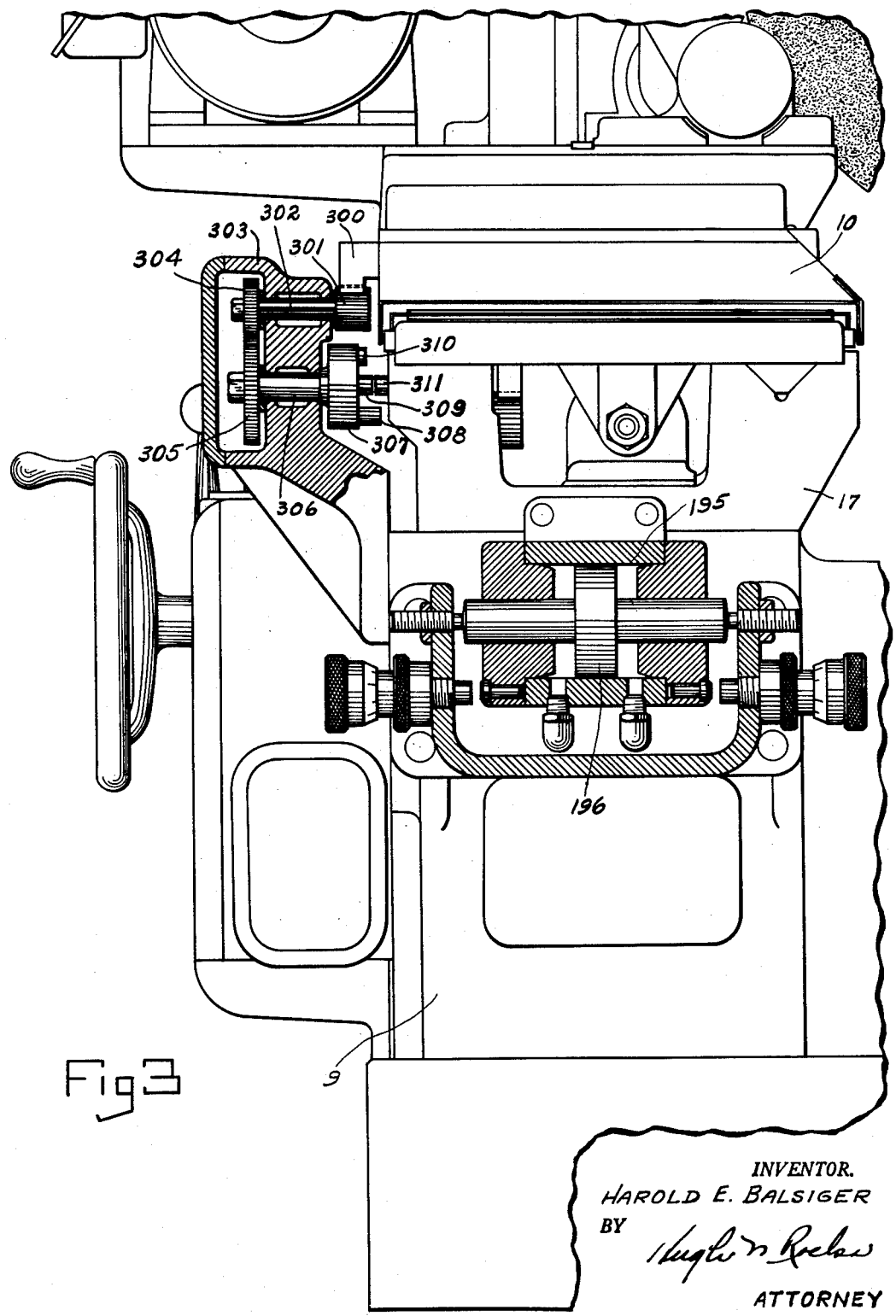
Figure 3 is a partial end elevation of the front section of the machine.
Figure 4:
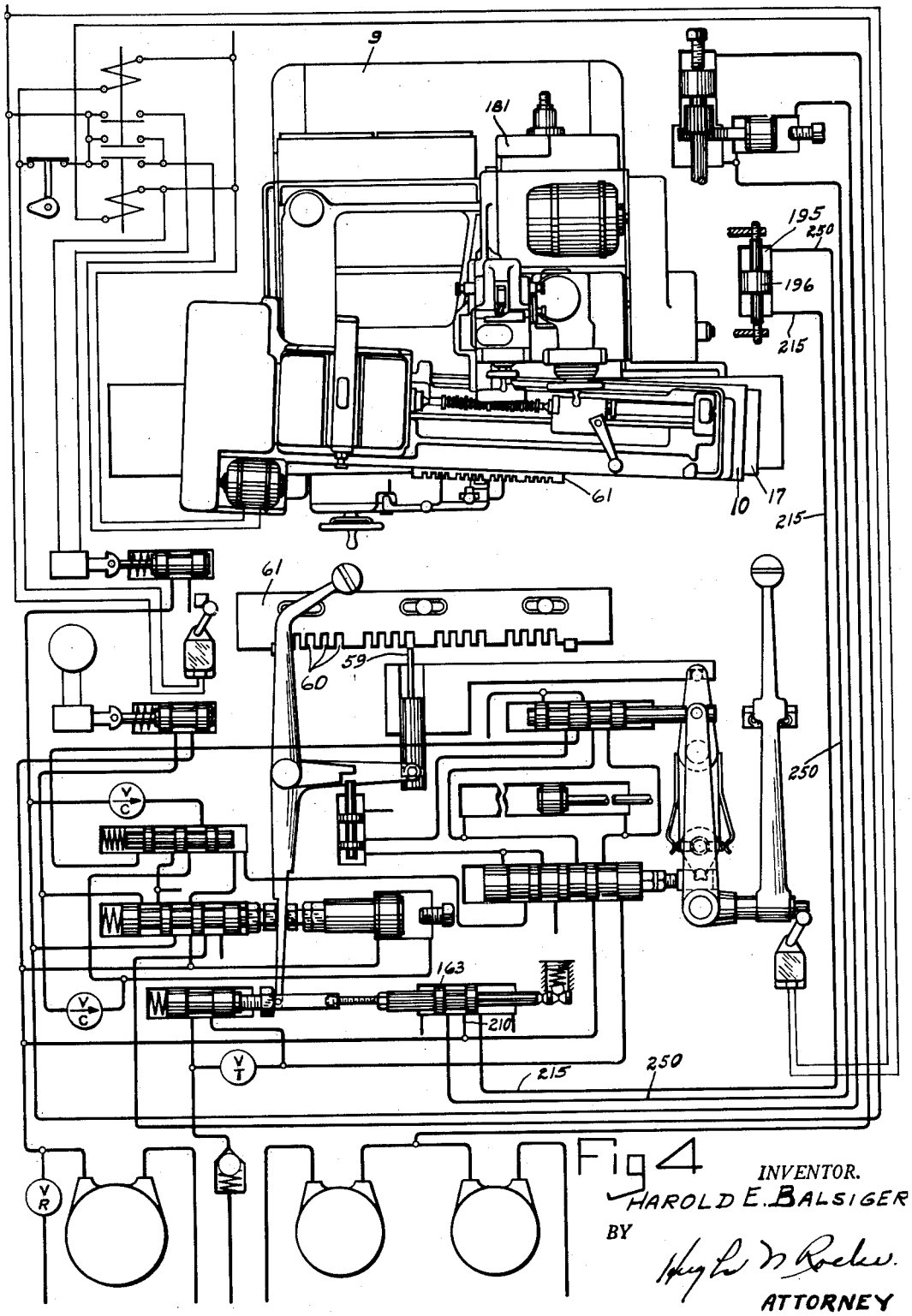
Figure 4 is a hydraulic and electric diagram.

The means for locating the work support in the various angular positions is shown in Figures 1 and 3. It consists of a rack 300 attached to work carriage 10. Said rack engages a gear 301 rotatably mounted on a shaft 302, in a bracket 303 attached to the bed 9. At the other end of shaft 302 is mounted a gear 304 which engages a gear 305 on shaft 306. At the opposite end of shaft 306 is a disk 307 on which are peripherally spaced a series of stops 308, 309 or 310, each of a different length. One of said stops is always in position to engage another stop member 311 on swivelling member 17. The above apparatus is shown and described for the purpose of illustration. This, as well as equivalent apparatus for this purpose, is well known and includes adjustably spaced dogs on a rack, engaging a star wheel which acts to position the several stops. Such a device is shown in Patent 2,105,841 granted January 18, 1938.

Where the swivelling member is a part of the wheel support as in the above mentioned Patent 2,654,189, the disk 307 is mounted in any suitable position on the bed to co-operate with means on the wheel support 181. For the purpose of illustration, said disk is mounted on a shaft 315 rotatably supported in a bracket 316 on the rear of bed 9. A lug 317 extending from the rear of wheel base 181 has a stop member 318 in position to engage any of the stops 326, 327, and 328 on disk 325. Also for the purpose of illustration, the means for rotating disk 307 in timed relation with the longitudinal movement of carriage 10 consists of a shaft 320 on which gear 305 is mounted at the front end thereof. Said shaft extends through to the rear of the bed and has a bevel gear 321 mounted thereon which engages another bevel gear 322 on shaft 315.

The wheel support 181, in this instance, is mounted to swivel about a pivot 182 which is located in a portion 183 of wheel support 181 which extends into the bed 9 under the work carriage 10. The vertical line passing through said pivot also passes through the point of contact between wheel 180 and one of the portions to be ground on work piece 14.

Operation

The motor, consisting of cylinder 195 and piston 196 may be utilized to swivel either the work support 10 or the wheel base 181. The means for actuating said swivelling motor is the same as that disclosed in the above mentioned patent and application except that the notches 60 in spacing bar 61 are of uniform depth. In this case when the plunger 59 is withdrawn from one of the notches 60 to permit the carriage to be moved to the rest position, valve 163 is shifted to the left to direct fluid under pressure through lines 210 and 250 to the right hand or upper end of cylinder 195. In each case, said cylinder is mounted on the movable member, the swivelling member 17 or the wheel support 181, the piston 196 being stationary. When fluid under pressure is introduced into the upper end of cylinder 195, the swivelling member 17 or wheel base 181 is shifted in a counter-clockwise direction. Carriage 10 then moves until the next notch is in position to receive plunger 59.

During the movement of carriage 10, rack 300 rotates pinion 301, shaft 302, gear 304, gear 305, shaft 306 and disk 307 to position one of the stops 308, 309, 310 or others in the path of co-acting stop 311 or 318 on swivelling member 17 or 181 respectively.

When said plunger drops into the notch, valve 163 is shifted to the right, directing the fluid under pressure from line 210 through line 215 to the left or lower side of cylinder 195. The swivelling member 17 or 181 is then moved in a clockwise direction until the stop 311 or 318 engages one of the movable stops 308, 309 or 310. The movable stops may be selected to locate the swivelling member at any position within its range of movement including the zero position with the work and wheel axes parallel.

I claim:

1. In a machine of the kind described, a bed, a grindwheel support slidably mounted thereon, a grinding wheel rotatably mounted on said support, a work support slidably mounted on said bed, means for rotatably supporting a work piece thereon, means for effecting relative transverse and longitudinal movement of said supports, means for effecting said longitudinal movement intermittently for grinding spaced portions of a work piece comprising an indexing mechanism, means for positioning one of said supports at different angles relative to the other in order to grind tapered surfaces on one or more of said portions including a pivotal mounting for said support, a movable member in the path of adjustment of said angularly adjustable member, said movable member having connections with said longitudinal moving means, a series of stops mounted in spaced relation on said movable member and means for effecting said angular positioning movement in the same direction against each of said stops for angularly locating said support for grinding tapered surfaces on said portions at any selected angle and direction within the range of said angular positioning means.

2. In a machine of the kind described, a bed, a grinding wheel support slidably mounted thereon, a grinding wheel rotatably mounted on said support, a work support slidably mounted on said bed, means for rotatably supporting a work piece thereon, means for effecting relative transverse and longitudinal movement of said supports, means for effecting said longitudinal movement intermittently for grinding spaced portions of a work piece comprising an indexing mechanism, means for positioning one of said supports at different angles relative to the other in order to grind tapered surfaces on one or more of said portions comprising a member mounted for angular adjustment between said bed and said support and means for actuating same, a movable member in the path of adjustment of said angularly adjustable member, said movable member having connections with said longitudinal moving means, a series of stops mounted in spaced relation on said movable member and means for effecting said angular positioning movement in the same direction against each of said stops for angularly locating said support for grinding tapered surfaces on said portions at any selected angle and direction within the range of said angular positioning means.

3. In a machine of the kind described, a bed, a grinding wheel support slidably mounted thereon, a grinding wheel rotatably mounted on said support, a work support slidably mounted on said bed, means for rotatably supporting a work piece thereon, means for effecting relative transverse and longitudinal movement of said supports, means for effecting said longitudinal movement intermittently for grinding spaced portions of a work piece comprising an indexing mechanism, means for positioning one of said supports at different angles relative to the other in order to grind tapered surfaces on one or more of said portions comprising a member mounted for angular adjustment between said bed and said support and means for actuating same, connections between said actuating means and said indexing mechanism, a movable member in the path of adjustment of said angularly adjustable member, said movable member having connections with said longitudinal moving means, a series of stops mounted in spaced relation on said movable member and means for effecting said angular positioning movement in the same direction against each of said stops for angularly locating said support for grinding tapered surfaces on said portions at any selected angle and direction within the range of said angular positioning means.

4. In a machine of the kind described, a bed, a grinding wheel support slidably mounted thereon, a grinding wheel rotatably mounted on said support, a work support slidably mounted on said bed, means for rotatably supporting a work piece thereon, means for effecting relative transverse and longitudinal movement of said supports, means for effecting said longitudinal movement intermittently for grinding spaced portions of a work piece comprising an indexing mechanism, means for positioning one of said supports at different angles relative to the other in order to grind tapered surfaces on one or more of said portions including a pivotal mounting for said support, means for actuating said angular positioning means including connections to said indexing means, a movable member in the path of adjustment of said angularly adjustable support and having connections with said longitudinal moving means, a series of stops mounted in spaced relation on said movable member, means for actuating said angular positioning means first in a direction away from said stops to the full extent of its movement in that direction and thereafter in a direction toward said stops whereby to effect angular positioning of said support in the same direction regardless of the direction of taper to be ground.

5. In a machine of the kind described, a bed, a grinding wheel support slidably mounted thereon and grinding wheel rotatably mounted on said support, a work support slidably mounted on said bed, means for rotatably supporting a work piece thereon, means for effecting relative transverse and longitudinal movement of said supports, means for effecting said longitudinal movement intermittently for grinding spaced portions of a work piece comprising an indexing mechanism, means for positioning one of said supports at different angles relative to the other in order to grind tapered surfaces on one or more of said portions, comprising a member having a swivel mounting between said bed and said support, and means for actuating same, said actuating means being operable by said indexing means, a movable member in the path of adjustment of said angularly adjustable support and having connections with said longitudinal moving means, a series of stops mounted in spaced relation on said movable member, means for actuating said angular positioning means first in a direction away from said stops to the full extent of its movement in that direction and thereafter in a direction toward said stops whereby to effect angular positioning of said support in the same direction regardless of the direction of taper to be ground.

6. In a machine of the kind described, a bed, a grinding wheel support, a grinding wheel rotatably mounted thereon, a work support, means for rotatably supporting the work piece thereon, a swivelling member pivotally mounted on said bed, one of said supports being slidably mounted on said member, the other being slidably mounted on said bed, means for effecting relative transverse and longitudinal movement of said supports, means for effecting longitudinal movement intermittently for grinding spaced portions of a work piece comprising a locating mechanism, means responsive to operation of said locating mechanism for actuating said swivelling member, for shifting the support mounted thereon to different angles relative to the other support in order to grind tapered surfaces on one or more of said portions, means including a movable member in the path of adjustment of said angularly adjustable support and having connections with said longitudinal moving means, a series of stops mounted in spaced relation on said movable member, means for actuating said angular positioning means first in a direction away from said stops to the full extent of its movement in that direction and thereafter in a direction toward said stops whereby to effect angular positioning of said support in the same direction regardless of taper to be ground.

7. In a machine of the kind described, a bed, a grinding wheel support slidably mounted thereon, a grinding wheel rotatably mounted on said support, a work support slidably mounted on said bed, means for rotatably supporting a work piece thereon, means for effecting relative transverse and longitudinal movement of said supports, means comprising an index mechanism for effecting said longitudinal movement intermittently for grinding spaced portions of a work piece, means for positioning one of said supports at different angles relative to the other in order to grind tapered surfaces on one or more of said portions comprising a swivelling member between said bed and said support and means for actuating same, a pivotal mounting for said swivelling member having a vertical axis tangent to the peripheral surface of line of said grinding wheel when said wheel is in contact with one of said portions to be ground, a movable member in the path of adjustment of said angularly adjustable support, said movable member having connections with said longitudinal moving means, a series of stops mounted in spaced relation on said movable member and means for effecting said angular positioning movement in the same direction against each of said stops for angularly locating said support for grinding tapered surfaces on said portions at any selected angle and direction within the range of said angular positioning means.

8. In a machine of the kind described, a bed, a grinding wheel support mounted thereon, a grinding wheel rotatably mounted on said support, a work support slidably mounted on said bed, means for rotatably supporting a work piece thereon, means for effecting relative transverse and longitudinal movements of said supports, means for positioning one of said supports at different angles relative to the other in order to grind tapered surfaces on one or more portions of a work piece including a pivotal mounting for said support, means for actuating said angular positioning means in one direction prior to grinding each of said portions, a movable member having a connection with said longitudinal moving means, a series of stops mounted in spaced relation on said movable member in the path of movement of said angularly adjustable member and means for actuating said angular positioning means in the other direction against each of said stops for angularly locating said support for grinding tapered surfaces on said portions at any angle and in any direction within the range of said angular adjusting means.

9. In a machine of the kind described, a bed, a grinding wheel support, a grinding wheel rotatably mounted thereon, a work support, means for rotatably supporting a work piece thereon, a swivelling member pivotally mounted on said bed, one of said supports being slidably mounted on said member, the other being slidably mounted on said bed, means for effecting relative transverse and longitudinal movement of said supports, means for effecting said longitudinal movement intermittently for grinding spaced portions of a work piece comprising a locating mechanism, means responsive to operation of said locating mechanism for actuating said swivelling member for shifting the support mounted thereon to different angles relative to the other support in order to grind tapered surfaces on one or more of said portions, means including a movable member in the path of adjustment of said angularly adjustable support and having connections with said longitudinal moving means for actuating said movable member, a series of stops mounted in spaced relation on said movable member, means operable in response to actuation of said locating mechanism when initiating an index movement, for actuating said angular adjusting means to shift said support in the direction away from said stops, said means being operable at the end of said index movement to reverse the movement of said angular adjusting means to shift said support in the direction toward said stops whereby to effect angular positioning of said support in the same direction regardless of the direction of taper to be ground.

10. In a machine of the kind described, a bed, a grinding wheel support, a grinding wheel rotatably mounted thereon, a work support, means for rotatably supporting a work piece thereon, a swivel member pivotally mounted on said bed, one of said supports being slidably mounted on said member, the other being slidably mounted on said bed, means for effecting relative transverse and longitudinal movement of said supports, means for effecting said longitudinal movement intermittently for grinding spaced portions of a work piece comprising a locating mechanism operable normally to locate and hold said longitudinally movable support in predetermined relation to said other support, means responsive to said locating mechanism when shifted away from said normal position to actuate said swivel member in one direction, said means being operable upon return to normal position to cause said swivel member to be shifted in the opposite direction, a series of stops and means operable in timed relation with said locating movement for moving said stops into the path of said swivel member for locating said support in a predetermined angular position as it moves in said opposite direction.

References Cited in the file of this patent

UNITED STATES PATENTS

| | | |
|---|---|---|
| 2,581,759 | Green | Jan. 8, 1952 |
| 2,654,189 | Dunn | Oct. 6, 1953 |
| 2,660,838 | Green | Dec. 1, 1953 |